Jan. 25, 1966  J. H. GOLDMAN  3,231,092
FILTER AND METHOD OF MAKING THE SAME
Filed Dec. 6, 1962

INVENTOR.
JOSHUA H. GOLDMAN
BY
ATTORNEY

United States Patent Office 3,231,092
Patented Jan. 25, 1966

3,231,092
FILTER AND METHOD OF MAKING THE SAME
Joshua H. Goldman, Hadlyme, Conn.
Filed Dec. 6, 1962, Ser. No. 242,726
2 Claims. (Cl. 210—457)

My present invention relates to filters and more particularly to a novel filtering element and a novel method of manufacture of the same.

The principal object of the present invention is to provide a filter element or cartridge consisting of a coarse foraminous fibrous matrix supporting and separating a previous media in web form. The matrix and media are spirally wound on a core to form a cylinder.

Another object of the present invention is to provide a filter and method of manufacture which is an improvement over my Patent Number 3,042,216, entitled Filter Construction, issued July 3, 1962.

Another object of the present invention is to provide a filter construction having a novel core designed to prevent collapse of the cylinder due to line pressure.

A further object of the present invention is to provide a filter construction which permits bonding of the filter element.

With the above and other objects and advantageous features in view, my invention consists of a novel arrangement of parts and a novel method of manufacture more fully disclosed in the detailed description following in conjunction with the accompanying drawing and more particularly defined in the appended claims.

Figure 1:
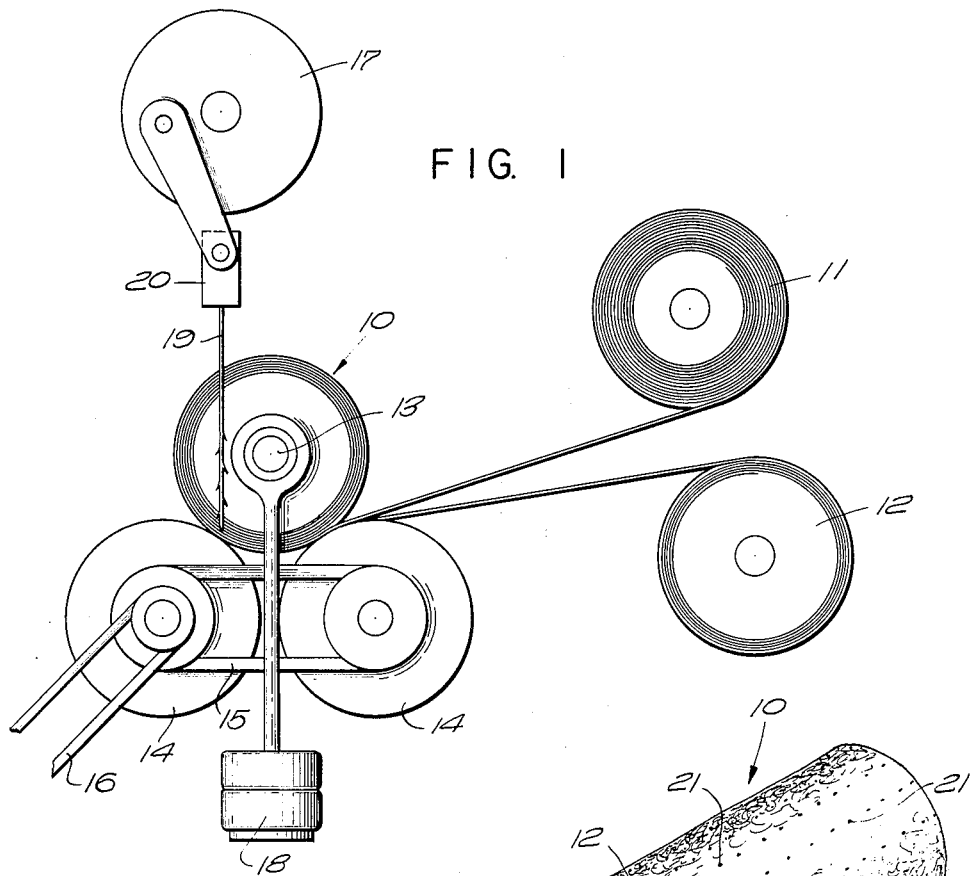
FIG. 1 is a diagrammatic view illustrating one method of manufacturing the filter of the present invention.

It has been found that fluid under pressure traveling through a filter has a tendency to follow the convoluted course of the matrix rather than passing radially through the more resistant filtering media. The present invention is designed to overcome this defect by integrating the outer several layers of the matrix and media by felting with barbed needles. Referring to FIG. 1, the filter 10 is formed from a web of filter media 11 and a bast fiber sheet or matrix 12. The filter is formed by winding the filter media 11 and matrix 12 around a central core on an arbor 13. A pair of horizontally aligned bed rolls 14 are connected for simultaneous drive by a belt drive 15 and are driven by a belt or chain 16 from a motor with an indexing clutch to provide an intermitten drive in cooperation with the cam drive 17. A weight 18 is suspended from the arbor 13 at each end to supply pressure during the winding operation.

Figure 2:
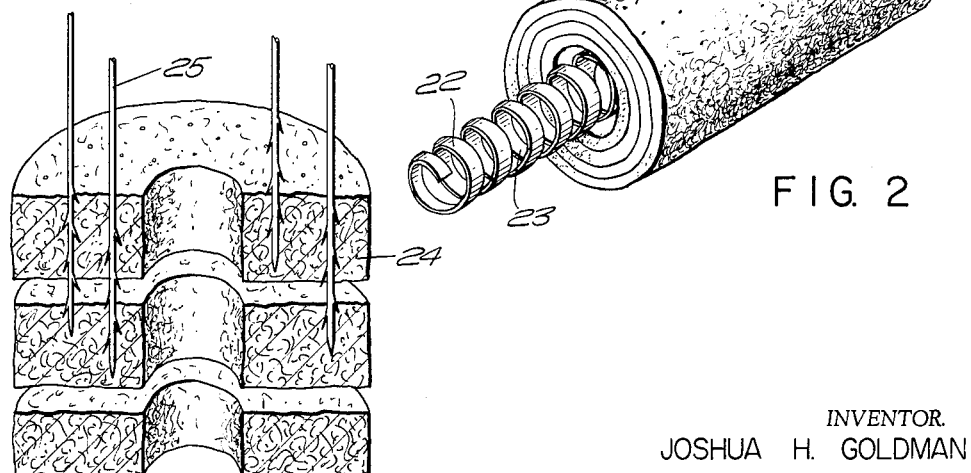
FIG. 2 is a perspective view of the filter with a portion of the cylinder being cut away to expose the core.

In the illustrated form the bast fiber sheet or matrix 12 is wound on the outside and the filtering media is wound on the inside. A row of vertically aligned felting needles 19 are mounted at 20 for vertical reciprocation through the filter 10 as it is being formed. The cam drive 17 serves to reciprocate the row of felting needles 19, and the indexing clutch (not shown) is designed to drive the bed rolls 14 through the chain or belt 16. This drive is in timed sequence so that when the needles are entering and leaving the filter 10, as shown in FIG. 1, the drive 16 is at a standstill. When the needles have completely withdrawn from the filter 10 the drive 16 will again move the rolls 14 and filter 10. However, as can be seen in FIG. 2, the needles leave tiny rows of openings 21 approximately ¼" apart, the needles also being positioned approximately ¼" apart. With this construction the moveemnt of the intermittent drive 16 is such that the filter 10 will move ¼" and then come to a stop to allow the needles 19 to enter and withdraw.

The resulting non-laminar mass of fiber provides a relatively coarse straining capacity and encourages an inward radial flow by virtue of the radially oriented turfs of both matrix and media. This also serves to trap the fine debris, the removal of which is the function of the filter. It desired the inner several layers of the structure need not be pierced by the felting needles so that several unperforated septa of filtering media must be transpired before the effluent reaches the core. However, when desirable, the needles may be operated close to and tangential to the core so that integration can be effected at any radial depth of the cylinder. Thus the density of the cartridge and the efficacy of filtration may be varied with the depth of the integration.

The structure illustrated in FIG. 1 provides a mechanical bonding of the fibers. However, a firmer bonding can be accomplished chemically by distributing a thermoplastic fiber through the filter, either through the matrix or the media or both. Thus the filter may provide for absorbent fibers such as cellulose and thermoplastic saran or solvent soluble fibers such as acetate or both such as nylon. By distributing approximately 10% of the thermoplastic fiber a final bonding is accomplished without interfering with the filtration. This can be done chemically or thermally or both. For example, acetone on acetate, carbolic or formic acid on nylon or heat on resins or nylon. The thermoplastic fibers may be used in place of needling so that a chemically bonded cartridge results. However, both can be used together so that after the integration by needling the integrity of the cartridge may be further enhanced by the bonding action of the thermoplastic or soluble fibers distributed throughout the mass.

The resistance to flow through the structure increases as the interstitial voids become clogged by the suspended particles removed from the fluid. To prevent the collapse of the cylinder due to line pressure, a core is employed to resist radial compression. This compression force is of considerable magnitude. The cylindrical cartridge is about 3" in diameter and about 10" in axial length having therefore a surface area of 100 square inches. When the cartridge is fouled sufficiently to prevent flow and the line pressure of 100 p.s.i. acts at the intake, a crushing force of 10,000 pounds or five tons is exerted on the unit. If no relief valve is provided, a rigid perforated tube capable of withstanding compression is conveniently used as a core. Such cores are expensive and afford an effluent area of about 15% because excessive perforations reduces the strength of the tube. I have found that a coiled spring wound to a pitch equal to twice the width of the strand provides a 50% open area and great resistance to crushing.

While preformed springs have been used heretofore to support yarn during the dyeing process where the pressures are moderate, the present invention provides for a core using a spring made of a flat band wound in situ and held in place by the successive winds of the matrix and media as shown in FIG. 2. In this form the flat spring metal 22 is wound into a core to provide a 50% open filter area 23 between the coils. Provision may be provided in the construction shown in FIG. 1, for winding the spring spirally along the arbor 13 before winding the matrix and filter media. If this spring were not confined by the cartridge it would expand because the band wound in situ is not preformed. For example, a spring wound on a 1" arbor and not confined would achieve a diameter of 1½" upon release. This provides a prestressing of the spring as follows:

Let $R$ = radius of arbor
$S$ = stress in band
$t$ = thickness of band
$E$ = modulus of elasticity of steel 30,000,000
$Z$ = elongation of outer fiber of band $$Z = t/2R$$
$$S = ZE$$

Given a band .015" thick wound on a radius of ½", $S = (30,000,000) \times (.015) = 450,000$ lbs. to the square inch. After release, $R = ¾"$ $$S = \frac{(30,000,000) \times (.015)}{1.5}$$

which is equal to 300,000 lbs. per square inch. The difference, 150,000 lbs. per square inch, is the amount of prestress available to resist collapse by application of radial pressure. The amount of prestressing will vary quantitatively with the metallurgical characteristics of the material and with the size and shape of the coil. The concept of prestressing a filter core is therefore one of the new elements of the present invention.

The use of the spring core provides another distinct advantage. In many installations the cartridges are used in tandem, a plurality of cartridges being used in a single filter installation. The spring core provides for a better seal between the cartridges because the spring core can be slightly collapsed to maintain a compressive force between each filter.

Figure 3:
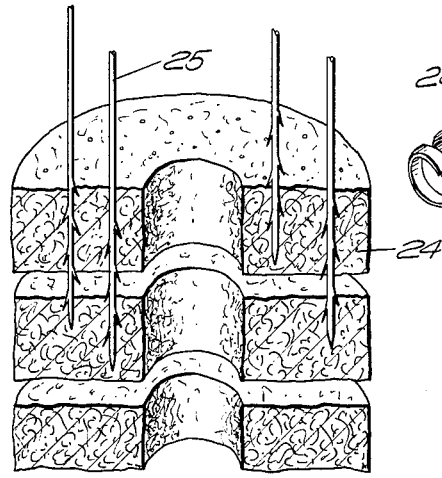
FIG. 3 is a perspective sectional view of another form of filter embodying my invention.

The construction illustrated in FIG. 3 is used where the diameter of the filter exceeds the axial length. As shown in FIG. 3 the filter disc 24 is needled by the felting needles 25 in a direction parallel to the axis. In previous constructions sheets of punched felt have been die cut into discs and assembled to form a cylindrical cartridge. The resultant trim is difficult to rework so that the cost is high. In accordance with the present invention the needling is accomplished in an axial direction so that precut discs may be axially needled and punched and then assembled to form a cartridge. The punching may be done from one side, both sides alternately or both sides simultaneously. The blanks 24 may be die cut from a picker lap or a bat made on a multicard range.

By spacing the needling in progressively narrower or wider increments as the core is approached, a graded density may be provided for filtering in depth either toward or away from the core. Furthermore, the example given of a 10% bonding fiber is illustrative only. Other fibers may be used in lesser or greater proportions.

I have thus provided for a filter in which the filter media may comprise a plurality of discs which may have joints sealed by compression, nonpermeable separators or an adhesive separator such as rubber cement. Since each disc has been worked and formed into an integral unit, a plurality of such discs may easily be formed into any size filter required.

I have thus provided a filter and method of manufacture in which the matrix and/or the filter media fibers may be integrated by needling, by chemical bonding, or by both. Furthermore, the strength of the filter is greatly enhanced by use of a prestressed spring core which affords a considerable amount of resistance to collapse of the filter cartridge. The filter of the present invention lends itself to many variations depending on the type of filtering or installation desired. Other advantages of the present invention will be readily apparent to a person skilled in the art.

I claim:
1. A filter comprising an axial core and a separator and a filter media alternately wound around said core, said core comprising a flat spring material spirally wound in open loops, said spring being prestressed, said separator and filter media being bonded to each other by felting.

2. The method of forming a filter comprising the steps of winding a flat spring on an arbor with the windings in spaced relation, and winding alternate layers of a separator and a filter media on said spring core while holding the core in tension to provide a prestressed core, and bonding said separator and filter media to each other by passing a plurality of felting needles through said filter during the winding operation.

References Cited by the Examiner
UNITED STATES PATENTS

| | | | |
|---|---|---|---|
| 2,672,673 | 3/1954 | Shaw | 28—4 |
| 2,731,183 | 1/1956 | Shaw | 28—4 X |
| 2,742,160 | 4/1956 | Fogwell | 210—494 X |
| 2,774,296 | 12/1956 | Martinmaas | 28—72.2 X |
| 2,970,365 | 2/1961 | Morgenstern | 28—72.2 X |
| 2,994,435 | 8/1961 | Moore | 210—457 X |
| 3,042,216 | 7/1962 | Goldman | 210—494 |
| 3,047,156 | 7/1962 | Wasson | 210—494 X |

REUBEN FRIEDMAN, *Primary Examiner.*
HARRY B. THORNTON, *Examiner.*